Aug. 9, 1949. L. G. RAICHE 2,478,708
HANDLING LINE MECHANISM
Filed April 10, 1945 2 Sheets-Sheet 1

INVENTOR.
LOUIS G. RAICHE
BY George F. Goodyear
ATTORNEY

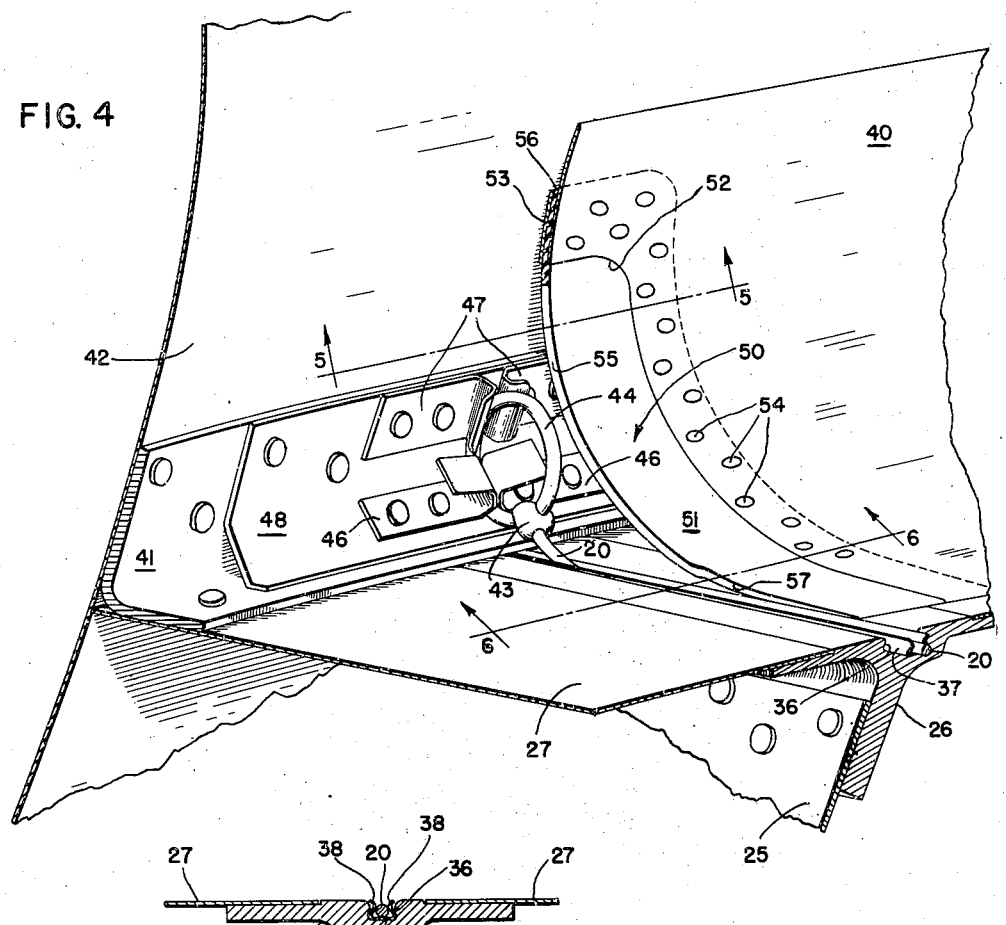

Patented Aug. 9, 1949

2,478,708

UNITED STATES PATENT OFFICE 2,478,708

HANDLING LINE MECHANISM

Louis G. Raiche, Williamsville, N. Y., assignor to Curtiss-Wright Corporation, a corporation of Delaware Application April 10, 1945, Serial No. 587,628

13 Claims. (Cl. 244—1)

This invention relates to aircraft handling equipment and is concerned with handling lines for directing or guiding the aircraft when the latter is being hoisted from place to place.

Heretofore, aircraft handling lines usually have been arranged in such a manner as to lie outside of the aircraft wing or fuselage contour. This exposure of the lines is undesirable as it increases drag forces on the aircraft, is conducive to turbulent air flow past the wings and generally produces noise. Moreover, the exposure of the lines can result in damage to the skin plates due to the vibration or whipping action thereof in a high velocity air stream.

It is an important object, therefore, to provide an aircraft, which at times must be hoisted from place to place, with handling lines so arranged and stowed as to overcome the disadvantages prevailing in prior arrangements of this nature.

A further object is found in the novel means for and highly advantageous manner of attaching, stowing and otherwise disposing of handling lines for use in connection with aircraft equipped with suitable means whereby the same may be hoisted.

These and further objects will be more particularly described in connection with the preferred arrangement hereof disclosed by the accompanying drawing, wherein:

Figure 3 is a further enlarged but fragmentary sectional elevation of the means for receiving and retaining the lines in stowed position, the view being taken at line 3—3 of Figure 1.

Figure 4 is an enlarged but fragmentary detail, in perspective, of the securing means for the inboard end of the lines as well as the novel manner of concealing the same.

Figures 5 and 6 are fragmentary sectional details of the concealing means of Figure 4, the views being taken along lines 5—5 and 6—6 respectively of Figure 4.

Figure 1:
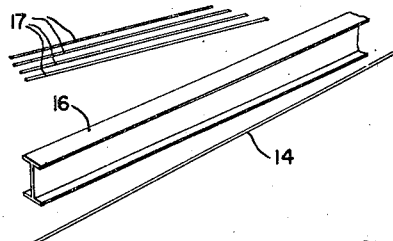
Figure 1 illustrates, in perspective, an aircraft equipped with handling lines and the novel means for attaching and stowing the same. This illustration also shows the aircraft or seaplane in hoisting position with respect to a water craft upon which it is to be carried.
Figure 1:
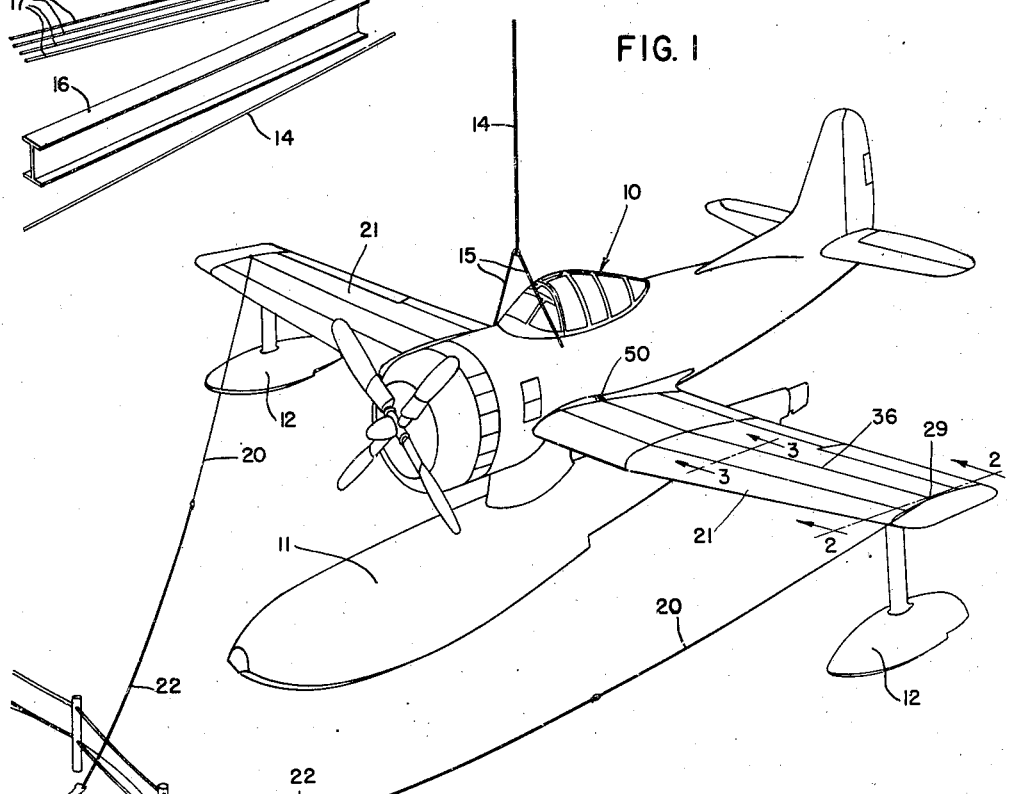

The usefulness of this invention is particularly illustrated in Figure 1 wherein the aircraft 10 is equipped with a main float 11 and wing floats 12 so that it may alight on the water prior to being hoisted to the deck of a watercraft 13. A hoist line 14, attached to the hoisting sling 15 of the aircraft, is supported by a boom or crane member generally represented at 16 and the latter is operated by a series of boom cables 17 extending from the outer end of the boom (not shown) to the crane operating means (not shown) which is well known in the art.

The aircraft or seaplane 10 is also equipped with handling lines 20 which are attached to the wing 21 at each tip portion and, when in use, are usually made fast to extension lines 22, the latter being manipulated by a deck hand located on the ship as at 23. It is evident that, during the hoisting of the seaplane, air currents, movement of the craft 13 and other factors, may cause the seaplane to swing or gyrate in such manner as to bring a part of the same into contact with the craft 13 or fixed objects on the latter. This is undesirable as damage to the seaplane 10 will result from such contact.

In previous arrangements, seaplanes have been equipped with externally positioned lines, or such lines have been passed to it from the deck of the ship when hoisting the same from the surface of the water. The present invention is directed to novel means for providing permanent and stowable handling lines and to the general arrangement of lines for easy accessibility when needed. Accordingly, the handling lines 20 are disposed or stowed within the wing envelope when not in use and may be easily reached by the pilot of the seaplane. The details thereof are clearly disclosed in Figures 2, 3 and 4 and the improved arrangement will now be described with reference to such disclosure. Since there are two handling lines, extending one from each wing tip, the description relating to the arrangement of one such line will be sufficient to cover both.

Figure 2:
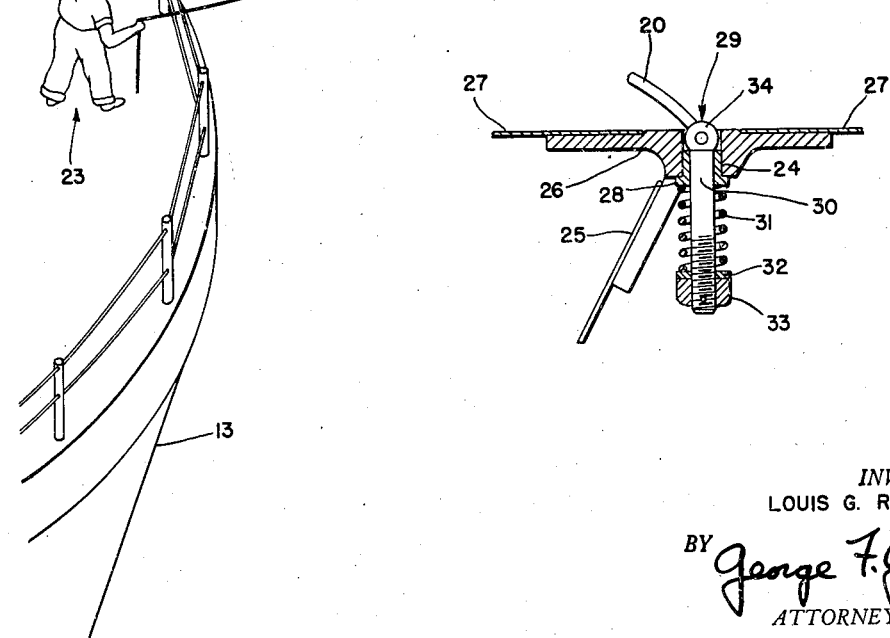
Figure 2 is an enlarged but fragmentary sectional elevation of a typical anchor means for securing one end of the handling lines, the view being taken at line 2—2 in Figure 1.

In Figure 2, the wing supporting beam 25 is provided with a beam cap member 26 to which the skin plates 27 are suitably secured in a flush relation. The cap member 26 is substantially coextensive with the wing span and is formed with an aperture 24 near its outer end. A bushing 28 is press fitted in this aperture from the under side thereof and guides a swivel pin 30, forming a part of anchor 29, around which is disposed a coiled spring or resilient element 31, the latter being placed in initial compression against the lower face of the bushing by a washer 32 and retainer nut 33 on the lower threaded end of the pin. The upper end of the pin is formed with or carries an eye element 34 which is normally positioned within the recess 24 so as to be substantially flush with the surface of the wing. A handling line 20 is then secured to the eye element 34 in any suitable manner. One form of attachment is to use a ball as the element 34, the ball being swaged on the line. The ball and pin may then be joined or welded together to form an integral anchor means.

Inboard of the location of anchor means 29 the beam cap 26 is formed with a longitudinal slot 36 (Figure 3) which is slightly under cut so that a resilient channel type clip 37 may be pressed into the slot and retained by engagement with the under cut side walls thereof. The form of the slot and the manner of the clip assembly may be seen in Figure 3. This arrangement of the clip 37 will result in its being flush with the wing surface. The line 20, which is adapted to be pressed into the clip by hand, will be held by the resilient lip elements 38 of the clip below the wing surface in an out-of-the-way position. The channel clip 37 and slot 36 extend substantially the full length of the wing span from the anchor means 29 to the zone of the wing fillet 40.

As shown in Figure 4 the inboard end of the line 20 extends into the area usually covered by the fillet strip 40 which conceals the match angle 41 used for attachment of the fuselage structure 42 to the wing skin plates 27 in a well known manner. A portion of the area beneath the fillet strip is utilized to house the releasable end of the handling line 20. The line is, therefore, provided with a swaged-on ball (not shown) which seats in a socket element 43 in turn secured to a ring element 44. The ball is movable with respect to the socket element so that the ring may swivel, and also so that the line 20 may adjust itself properly when being stowed.

The ring 44 is adapted to be held in an erect position by and between a pair of anchor clips 46 and a second pair of positioning clips 47. These clips are secured to and arranged upon a bracket 48 carried by the match angle 41, all as clearly shown in Figure 4. In the stowed position the removable end of the line 20, above noted, is concealed by, but readily accessible through, a resilient cover means 50 which forms a part of the otherwise continuous fillet 40. In the view of the drawing only a part of the cover means 50 has been shown, the remainder being broken away to reveal the details of the securing means for the ring 44. However, the views of Figures 5 and 6 will serve to show how the cover means 50 is arranged to permit passage of the ring and line, while still functioning as a part of the fillet means 40.

With reference to Figures 4, 5 and 6 the cover means 50, consisting of a resilient material 51 such as rubber, is generally shaped to match with and conform to the fillet contour by suitable rigid securement along three of its margins to the corresponding margins of a cut-out portion or notch 52 in the fillet strip 40. The resilient material is marginally recessed so as to bring its exposed surface area flush with the outer fillet surface. The area of the closure means lapped by the fillet strip is reinforced by a metallic backing piece 53. Flush rivets 54 may then be used to secure the pieces 51 and 53 in final position.

It will be noted that the resilient cover 51 is split along its transverse median line 55 except for a relatively short connecting portion 56 at the upper margin as viewed in Figure 4. The line of separation 55 is further shown in Figure 5 wherein the abutting lips are indicated as slightly thickened to provide a stiffening bead. Another portion of the split cover which more closely overlies the wing slot 36 is notched as at 57 (Figures 4 and 6) to permit the line 20 to pass through without causing an undesirable bulge in the surface thereof. Furthermore, the margin of the cover piece 51 lying on the surface of the wing has been tapered to a relatively thin edge for reducing its airflow drag effect.

It is now evident that the handling line is easily and quickly stowable or removable. The slot 36 in the surface of the wing, while not affecting the structure in any way, allows stowage of the handling line within the wing envelope so as to eliminate air flow disturbances, decrease drag and reduce undesirable noise. The ring element 44 is completely hidden when not in use, but is easily withdrawn by the pilot simply by spreading or parting the split, resilient cover means 51 and grasping the ring. Thereafter the pilot may free the line from clip 37 by pulling on the line, or the line extension 22 may be made fast to the ring 44 after its release from the clips and the deck hand at 23 effect release of the line 20.

Since there are at least two such handling lines 20 shown, what has been said concerning the one associated with the left wing portion 21 in Figure 1 is equally applicable to the other.

Another feature thereof resides in the resilient anchor means 29 at each wing tip. This construction permits extension and free swiveling of the pin thereby preventing undue bending and twisting of the line 20 at that end. The anchor is also automatically retractable to flush position.

In seaplane construction it may be desirable to fold the wing members for compact stowage when not in use. When such is the case the foldable wing section is folded about a hinge axis which either intersects the wing surface or lies in this surface. In the first case of an intersecting hinge axis it is necessary to run the handling line through the axis, so that upon folding of the wing the line will not bend or bind in a manner to cause injury either to it or the wing structure. When the axis of fold is in the surface of the wing as in the second case mentioned, care must be exercised in the arrangement of the stowage recess 36 so that the line will not bend too sharply or interfere with the free action of the folding mechanism. In either of the examples mentioned, the line must be given sufficient room for longitudinal shifting during the wing folding operation. Generally, such shifting will occur between the folding axis and the inboard or releasable end of the line. Accordingly, the socket element 43 will permit a certain amount of shifting of the line due to the fact that the ball (not shown) swaged on the end thereof can move outwardly of the socket toward the center of the ring 44. This ball and socket arrangement is well known in the art and hence no detail disclosure is believed necessary.

The foregoing description has dealt with one preferred form and arrangement of a stowable handling line for use with aircraft of the seaplane type. Such disclosure, nevertheless, should be considered as instructive of the general concept of the present invention, and such limitations necessarily imposed thereon will be defined by the claims appended hereto.

What is claimed is:

1. In a handling line installation for use with an aircraft adapted to be hoisted and moved bodily from place to place and in which the sustaining airfoil for the aircraft is formed with a recess extending inwardly from the tip portion of the sustaining airfoil, a handling line, an anchor means positioned in said recess at the tip portion thereof, said handling line being attached to said anchor means, resilient means adapted normally to hold said anchor means substantially within the recess, but yieldable under tension in the handling line to extend outwardly of the recess, and resilient means disposed within said recess in position to receive the handling line and retain the same inwardly of the airfoil surface until withdrawn for use to guide the aircraft during hoisting thereof.

2. The combination in an aircraft having a fuselage and a sustaining wing, the latter being formed to provide a recess extending from the wing root zone at the fuselage to the wing tip, of a handling line for guiding the aircraft when the same is being hoisted from place to place, means positioned at the wing tip end of said recess for attaching one end of said line, means located in the wing root zone at the fuselage for releasably retaining the opposite end of said line, and means in said wing recess for releasably retaining said line along its length in an out-of-the-way position when not in use to guide the aircraft during hoisting thereof.

3. The combination in an aircraft having a fuselage and a sustaining wing, the latter being formed to provide a separate recess extending from the wing root zone at each side of the fuselage to the corresponding wing tips, of handling lines for guiding the aircraft when the same is being hoisted from place to place, means positioned at each wing tip end of said recesses for attaching one end of each handling line, means in each of said wing recesses for releasably retaining the respective handling lines along the length thereof for positionment within the wing surface contour, means at the wing root zone of each of said recess for releasably retaining the opposite end of the respective handling lines, and means disposed between said wing root and fuselage for enclosing and fairing said last means into the aircraft.

4. The combination in an aircraft having a fuselage and a sustaining wing, the latter being formed to provide a separate recess extending from the wing root zone at each side of the fuselage to the corresponding wing tips, of handling lines for guiding the aircraft when the same is being hoisted from place to place, anchor means positioned at each wing tip end of said recesses for attaching one end of each handling line, elongated clip means in each of said wing recesses for releasably retaining the respective handling lines along the length thereof for positionment within the wing surface contour, other clip means at the wing root zone of each said recess for releasably retaining the opposite end of the respective handling lines, and means disposed between said wing root and fuselage for enclosing and fairing said last means into the aircraft.

5. In an aircraft, a surface of the aircraft having a line receiving recess extending therealong, a line disposed in said recess and anchored at one end to the aircraft, a pocket in the aircraft adjacent the opposite end of the line, a split flexible cover on the surface of the aircraft overlying said pocket, and detachable means connecting said opposite end of the line to the aircraft within said pocket, said detachable means being accessible through the split of said cover to permit withdrawal of said opposite end of the line therethrough.

6. In an aircraft, a surface of the aircraft having a line receiving recess extending therealong, a line disposed in said recess and anchored at one end to the aircraft, a pocket in the aircraft adjacent the opposite end of the line, a split flexible cover on the surface of the aircraft overlying said pocket, said split being substantially aligned with said recess, and detachable means connecting said opposite end of the line to the aircraft within said pocket, said detachable means being accessible through the split of said cover to permit withdrawal of said opposite end of the line therethrough and displacement of the line from the recess.

7. In an aircraft, a surface of the aircraft having a line receiving recess extending therealong, a line removably disposed in said recess, anchoring means carried by the aircraft at one end of the recess and attached to one end of the line, resilient means for normally holding the anchoring means substantially within the recess but yieldable under tension in the line to extend outwardly of recess.

8. In an aircraft, a surface of the aircraft having a line receiving recess extending therealong, a line removably disposed in said recess, a line anchoring member movably mounted on the aircraft and having a line attaching portion normally disposed in said recess, said member being movable to extend said line attaching portion outwardly of the recess, and resilient means yieldable under tension in said line for retaining the line attaching portion of the member in the recess.

9. In combination with an aircraft having a surface provided with a line receiving recess extending therealong, a flexible line anchored at one end to the aircraft, the opposite end of the line and the intermediate portions thereof being free of the aircraft when in use for aircraft handling purposes, means releasably securing the unanchored end of the line to the aircraft for holding the line when not in use in substantially fully extended condition within said recess, and resilient means within said recess intermediate of its ends for releasably receiving and holding the intermediate portions of the line within the recess.

10. In combination with an aircraft having a surface provided with a line receiving recess extending therealong, a flexible line anchored at one end to the aircraft, the opposite end of the line and the intermediate portions thereof being free of the aircraft when in use for aircraft handling purposes, means releasably securing the unanchored end of the line to the aircraft for holding the line when not in use in substantially fully extended condition within said recess, and the walls of said recess having resilient portions at least partially closing the mouth of the recess for receiving and holding the intermediate portions of the line within the recess.

11. In combination with an aircraft having a surface provided with a line receiving recess extending therealong, a flexible line anchored at one end to the aircraft, the opposite end of the line and the intermediate portions thereof being free of the aircraft when in use for aircraft handling purposes, means releasably securing the unanchored end of the line to the aircraft for holding the line when not in use in substantially fully extended condition within said recess, and a resilient strip extending along at least one side wall of the recess at least partially closing the mouth thereof for releasably receiving and holding the intermediate portions of the line in the recess.

12. In combination with an aircraft having a surface provided with a line receiving recess extending therealong, a flexible line anchored at one end to the aircraft, the opposite end of the line and the intermediate portions thereof being free of the aircraft when in use for aircraft handling purposes, means releasably securing the unanchored end of the line to the aircraft for holding the line when not in use in substantially fully extended condition within said recess, and a resilient channel disposed in and extending substantially the length of the recess, said channel having undercut side wall portions at least partially closing the mouth of the recess for releasably receiving and holding the intermediate portion of the line within the recess.

13. In combination with an airplane having a sustaining airfoil and a pilot's compartment disposed at an intermediate portion of the airfoil's span, a pair of handling lines for the aircraft, means for anchoring one end of each line to said airfoil at a point near one tip thereof, the opposite end of each line being arranged to be handled free of the aircraft and free of the other line when in use, the airfoil having in the surface thereof a recess for each line for stowing the latter when not in use, said recesses extending spanwise of the airfoil from the anchoring means to points adjacent the pilot's compartment, means at each of said last mentioned points and recessed within the airplane for releasably securing the unanchored end of the respective line to the airplane with the line in substantially fully extended condition within its respective recess, and resilient means within said recesses for releasably receiving and retaining therein the portions of the lines intermediate of their ends.

LOUIS G. RAICHE.

REFERENCES CITED

The following references are of record in the file of this patent:

UNITED STATES PATENTS

| Number | Name | Date |
|---|---|---|
| 1,023,077 | Grout | Apr. 9, 1912 |
| 1,346,772 | Stupar | July 13, 1920 |
| 1,597,918 | Mangan | Aug. 31, 1926 |
| 1,909,445 | Ahola | May 16, 1933 |
| 2,106,323 | Huntington | Jan. 25, 1938 |
| 2,333,559 | Grady | Nov. 2, 1943 |

FOREIGN PATENTS

| Number | Country | Date |
|---|---|---|
| 417,813 | Great Britain | Oct. 12, 1934 |